United States Patent [19]

Okada et al.

[11] 3,960,463

[45] June 1, 1976

[54] METHOD OF STARTING OPERATION FOR A PUMP OR A PUMP TURBINE

[75] Inventors: Masayasu Okada; Hisao Inoue, both of Hitachi, Japan

[73] Assignee: Hitachi, Ltd., Tokyo, Japan

[22] Filed: Dec. 11, 1974

[21] Appl. No.: 531,700

[30] Foreign Application Priority Data
Dec. 12, 1973  Japan.............................. 48-137712

[52] U.S. Cl..................................... 415/1; 415/500
[51] Int. Cl.² ................... F01D 17/00; F03B 15/20
[58] Field of Search................................ 415/1, 500

[56] References Cited
UNITED STATES PATENTS

| 3,403,888 | 10/1968 | Hartland................................ 415/1 |
| 3,533,709 | 10/1970 | Willi ..................................... 415/1 |

*Primary Examiner*—Henry T. Klinksiek
*Attorney, Agent, or Firm*—Thomas E. Beall, Jr.

[57] ABSTRACT

In a starting operation of a pump or a pump turbine with high head and large capacity, adjustable guide vanes are fully closed and compressed air is introduced within the runner casing to depress water around the runner. When the runner begins to rotate at a synchroous speed, the guide vanes are excessively opened to an over opening position where no reverse flow of the discharge flow occurs. After the stream of the discharge flow becomes steady, the guide vanes are moved conversely to a predetermined opening position where the maximum flow rate of the pump is obtained with low noise and low vibration.

The present invention relates to a starting operation for a pump or a pump turbine with adjustable guide vanes circumferencially arranged around the runner, and more particularly to a starting operation for a pump or a pump turbine which is operated by controlling the opening of the adjustable guide vanes.

5 Claims, 4 Drawing Figures

METHOD OF STARTING OPERATION FOR A PUMP OR A PUMP TURBINE

BACKGROUND OF THE INVENTION

In the operation of a pump with high head and large capacity, because of the high head and large discharge flow rate, total energy which causes vibration and noise is great. In particular, operation with low noise and low vibration is desired in normal driving points of the pump for obtaining a high efficiency.

1. Occurrence of discontinuity in head capacity curve of pump operation.

In a pump operation, it is known that, when the pump is operating under a small flow rate region, a reverse flow of the discharge occurs in the runner on the shroud side of the pump inlet. This phenomenon is a main cause of the discontinuity in the head capacity curve of the pump operation, where sudden changes of flow of the discharge occur at the runner vane entrance. A. J. Stepanoff also proves this phenomenon in his publication: "Centrifugal and Axial Flow Pump" published by John Wiley & Sons, Inc.

In a pump with adjustable guide vanes, the head capacity curve changes in accordance with the opening of the guide vanes, which also changes the range of capacity where discontinuities in head capacity curve occurs. When the operating capacity of the pump is below the range where discontinuities in the head capacity curve appears, the noise and vibration induced during the operation of the pump is much greater than that during the operation above the range of discontinuities. This phenomenon makes it objectionable to operate a pump with high head and large capacity, especially in a starting operation in high static head regions.

2. Conventional starting operation of a pump or a pump turbine by controlling adjustable guide vanes.

In order to start a pump operation, it is a known method that first the guide vanes around the pump runner are fully closed under a condition in which compressed air is introduced within the runner casing to depress the water around the runner so that the runner can be rotated by a motor freely in air with minimum losses. When the runner begins to rotate at a synchronous speed of the motor, the guide vanes are gradually opened to a predetermined opening position where the pump is designed to operated with maximum flow rate and efficiency.

However with a conventional starting operation of a high head large capacity pump, owing to discontinuities in head capacity curve of the pump, it is impossible to obtain a desired maximum operation at a corresponding predetermined opening position of the adjustable guide vanes. Worse yet, the conventional operation is accompanied by large noise and vibration not only in a period of the starting operation but also in the normal operation.

3. Proposed counter measures for overcoming the undesirable operating characteristic of the pump.

There have been many counter measures for overcoming this problem. For example Stepanoff discloses that the discontinuity in the head capacity curve can be reduced or eliminated by providing two concentric bell shaped baffles at the pump suction to distribute the inlet flow.

By these methods which employ new or improved structures of the pump, head capacity characteristics can be improved only in a small flow rate region, but in a large flow rate region, the pump characteristics get worse. But there has been no counter measure for overcoming the problem by employing only a new or an improved method of starting for pump operation.

SUMMARY OF THE INVENTION

One object of the present invention is to provide a method of starting operation for a high head large capacity pump which is operated with reduced noise and vibration.

Another object of the present invention is to provide a method of starting operation for a high head, large capacity pump which is operated with high efficiency.

Still another object of the present invention is to provide a method of starting operation of a pump or a pump turbine which requires reduced strength for the structure of the pump or the pump turbine.

In a starting operation of a pump or a pump turbine by controlling the opening of adjustable guide vanes, sudden changes of discharge flow occur in the runner at a certain opening position of the guide vanes. This phenomenon causes discontinuities in the head capacity curve of the pumping operation.

A hysteresis characteristics of the pumping operation is found to appear on the range of discontinuities. According to the present method to start for an optimum pumping operation, by taking advantage of the hysteresis characteristics of the pumping operation, first guide vanes are excessively opened from a full closed position to an over opening extent position where no reverse flow in the runner and no change in the discharge flow appears, so that the pump operates under a condition above the range of the discontinuities in the head capacity curve. After the flow of the pump or the pump turbine becomes steady, guide vanes are moved conversely to reclose to a predetermined opening position where the pump is operated with maximum flow rate and efficiency.

DESCRIPTION OF THE PREFERRED EMBODIMENTS

The present invention is primarily concerned with a large capacity high head reversible pump turbine for hydro-electric power generation, and the following descriptions are examples of a reversible pump turbine being operated at pumped storage power stations, but this invention is not limited to a reversible pump turbine and is applicable to every hydraulic pump having adjustable guide vanes circumferentially arranged around the pump runner.

Figure 1:
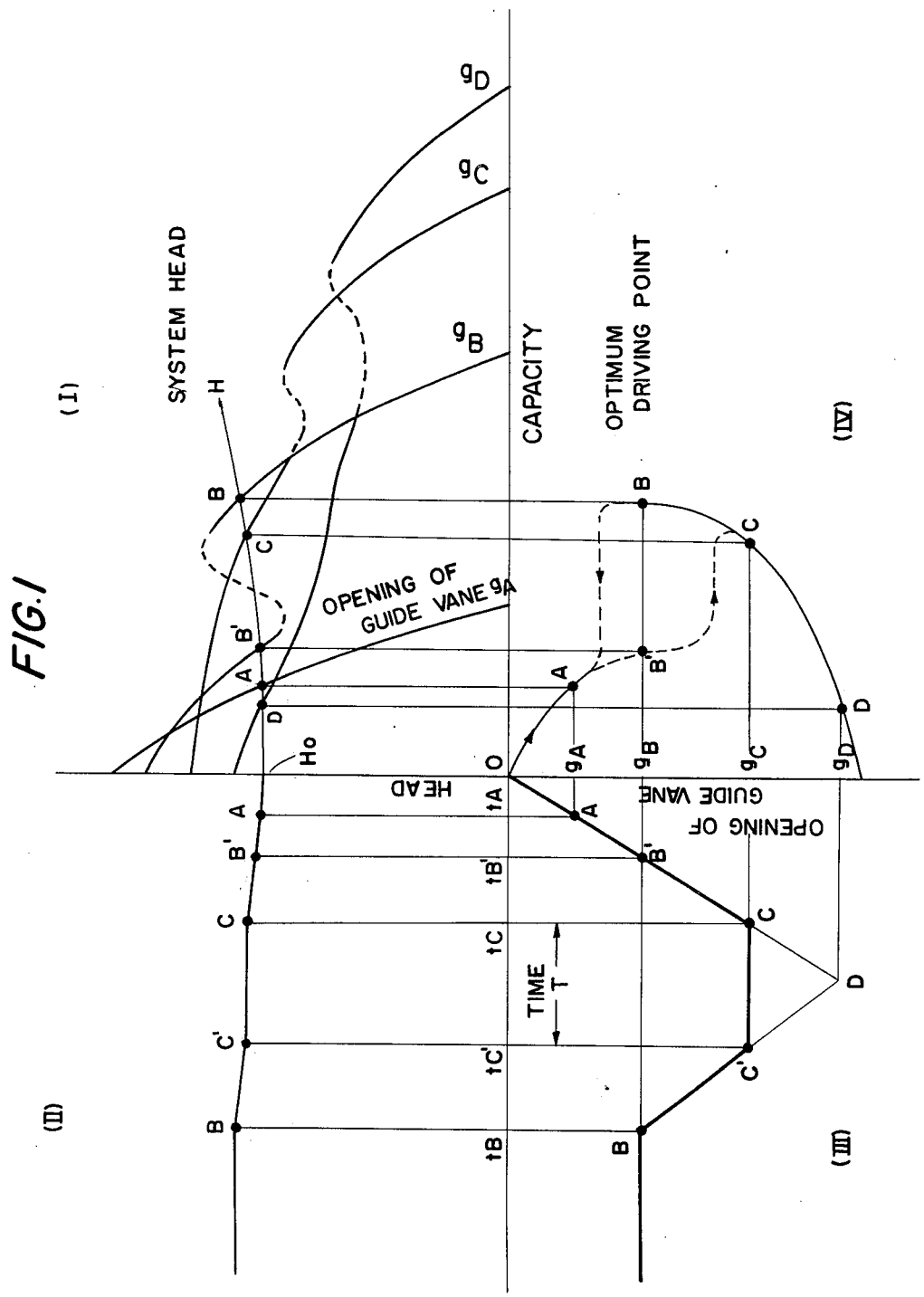
FIG. 1 is a four-quadrant graph in accordance with the present method of the starting operation of a pump or a pump turbine, in which the 1st quadrant of FIG. 1 shows head-capacity curves at different opening extents of the guide vanes, the second and third quadrants of FIG. 1 respectively shows the change in the head and the opening of the guide vanes against time, and the fourth quadrant of FIG. 1 shows the change in the capacity in accordance with the change in the opening of the guide vanes as illustrated in the third quadrant of FIG. 1.

Referring now to the 1st quardrant of FIG. 1, there are illustrated four head capacity curves (Q-H curves) respectively at different opening positions of guide vanes $g_A$, $g_B$, $g_C$, and $g_D$ ($g_A < g_B < g_C < g_D$). These curves are experimentally obtained and magnified for explanation at around the specific discharge flow rate range where the sudden changes in the discharge flow rate occur and the discontinuity in the head capacity curve appears. Dotted lines in head capacity curves indicate the discontinuity ranges and the unsteady region in the pump operation.

Intersections A, B, B', C and D of the system head curve H–H$_0$ and the head capacity curves indicate the driving points of the pump respectively at the opening positions of the guide vanes $g_A$, $g_B$, $g_{B'}$, $g_C$ and $g_D$. The intersection B indicates the optimum operating point of the pump where maximum flow rate at the designed system head is obtained with low noise, low vibration and higher efficiency.

The third and fourth quadrants of FIG. 1 are used to further explain the invention so that it can be understood easily. In the pumping operation, when the runner is rotating at a synchronous speed, the guide vanes are gradually opened from the fully closed position O with a certain speed of opening. When the opening of the guide vanes passes the opening position $g_A$ at the time $t_A$, the pump suddenly enters into the unstable region where reverse flow occurs in the runner. This unstable region of the pump operation causes the discontinuity in head capacity curves as illustrated by the dotted line in the 1st quadrant of FIG. 1. After the opening position of the guide vanes passes the opening position $g_B$ at the time $t_{B'}$ which is the same as the final optimum opening position, the guide vanes are still further moved in the opening direction to the over opening position $g_C$ at the time $t_C$ where the pump enters into the stable region and no reverse flow appears in the runner as illustrated by the point C. Then the guide vanes are continuously kept on the opening position $g_C$ for an optimal holding time T. When the stream line in the pump and the water way pipe (not shown) connecting the pump and an upper reservoir becomes steady, the guide vanes are conversely moved in the closing direction. Owing to the hysteresis characteristics of the pump operation as illustrated by the dotted lines in the fourth quadrant of FIG. 1, the discharge flow rate gradually increases along solid line CB in the I and IV quadrants and reaches at the desired maximum flow rate on the opening position $g_B$ at the time $t_B$ as represented on the point B.

The normal pump operation of the point B obtained by the present method is superior to that on the point B' by the conventional method in regard to either noise, vibration or efficiency. Moreover, because of reduced noise and vibration, the equivalent amount of head and capacity is obtained with a reduced strength of the structure of the pump and the water way pipe.

In the above described starting operation of a pump, the optimum opening of the guide vanes $g_B$, the over opening position $g_C$ and the holding T can be estimated experimentally from the actual operation of a pump or a model test.

In the present example, the opening of the over opening position $g_C$ is 71%, the opening of the final opening position $g_B$, is 64% and the holding time T is set 150 (seconds).

The final optimum opening position; $g_B$ is determined from the optimum driving point B where the maximum discharge flow rate is obtained at the designed (desired) static head.

The over opening position $g_C$ is determined from the experimentally obtained head capacity characteristic curve, that is, the flow rate thereon is approaching and smaller than that on the optimum driving point B and if the guide vanes move from the over opening position $g_C$ toward the closed direction, no reverse flow in the rotor occurs. The desirable over opening position $g_C$ is the minimum opening extent that no reverse flow in the runner occurs when opening the guide vanes from a closed position during starting. The more the over opening extent of guide vanes is increased beyond the opening point C, for example as represented by the point D at guide vane opening $g_D$, ($g_D > g_C$) the more time it requires for the starting operation to reach the optimum driving point B. While, if the extent of over opening position of guide vanes is smaller than $g_C$, for example between $g_B$ and $g_C$, due to the hysteresis characteristics of the pumping operation, the final driving point reaches to the point B' not to the point B and the optimum pump operation cannot be obtained.

It is sufficient that the holding time T, while keeping the over opening position of guide vanes constant at extent $g_C$, is long enough to stabilize the stream line in the pump and in the water way pipes connected to the pump after they have became transitionally unstable owing to the movement of the guide vanes in accordance with the starting operation. For instance it is sufficient that the holding time T is longer than L/V second, where L is the length of the water way pipe connected to the pump, V is the speed of discharge flow (meter/second).

If in a specific example, L = 200 (meter), V = 6 (meter/second), then the holding time T = 33 (second) is satisfactory.

In the present method of starting operation when used for a pump with surge tanks at the halfway on the water way pipe, it is desirable that the holding time T is much shorter than the period of the fluctuation of the surge tank so that the fluctuation of head in the water way and the pump caused by the transitional movement of guide vanes does not affect the fluctuation of the surge tank. In the present example, $T = T_s \times 10^{-2}$ or $T = T_s \times 10^{-3}$ in which T is the holding time and $T_s$ is the period of the fluctuation of the surge tank.

It is also possible that instead of keeping the over opening position of the guide vanes $g_C$ constant during a holding time, the guide vanes may be excessively moved without pause to the over opening position where no reverse flow occurs in the runner regardless of head, for example, as illustrated on the point D in the third quardrant of FIG. 1 and moved to the reverse direction and reclosed to the final opening position of the guide vanes; $g_B$ at time $t_B$.

Figure 2:
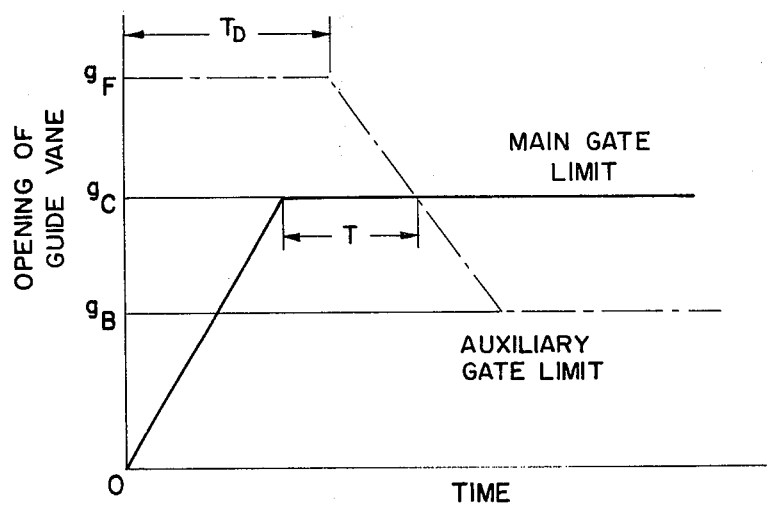
FIG. 2 is a graph on which the opening of the guide vanes is plotted against time.

Referring now to FIG. 2, there is illustrated one embodiment of the present method to provide the above described sequences of opening of the guide vanes, which employs two gate limits, the main gate limit and the auxiliary gate limit.

Figure 3:
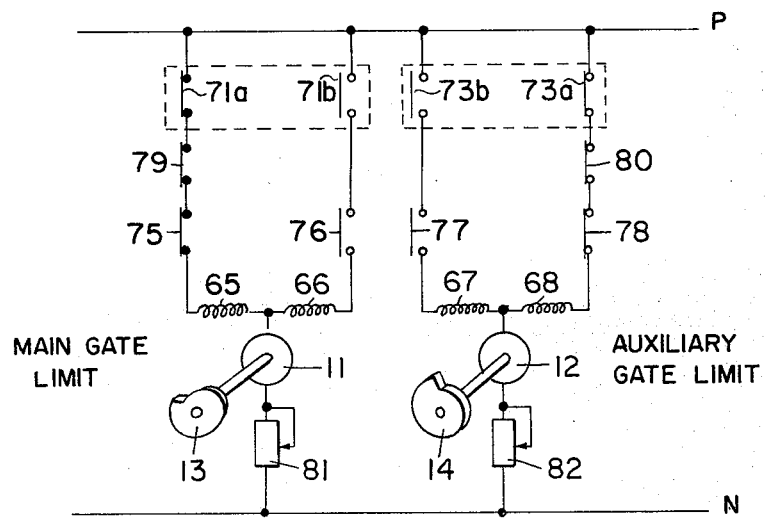
FIG. 3 is a circuit diagram of main and auxiliary gate limit relay circuits.
Figure 4:
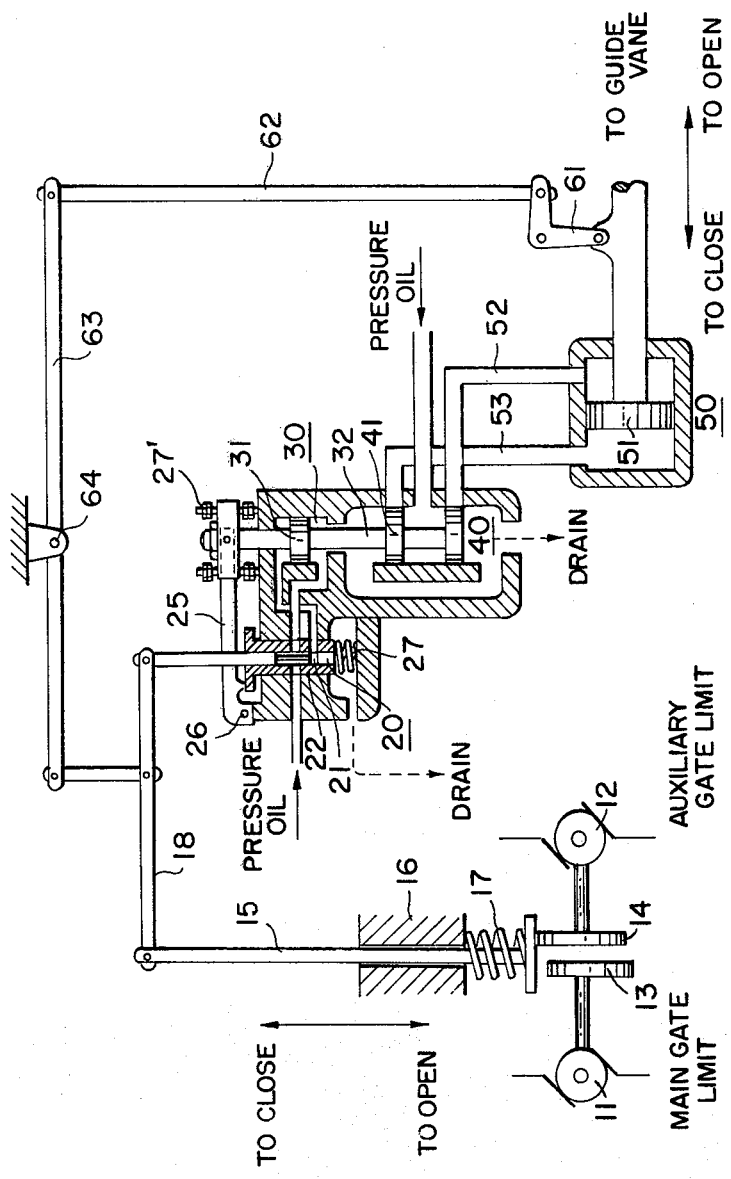
FIG. 4 is one diagramatic embodiment of the servomotor system.

These two gate limits are produced in the gate limit relay circuit as illustrated in FIG. 3 and the opening of the guide vanes is limited in accordance with the minimum gate limit of the two gate limits by the servomotor system as illustrated in FIG. 4.

Referring to FIG. 3 there is illustrated a main gate limit relay circuit, and an auxiliary gate limit relay circuit. A main gate limit motor 11 is provided with two field coils 65, 66 therefor when the field coil 65 is energized, the main gate limit motor 11 rotates in the opening direction of the guide vanes, and on the contrary when the field coil 66 is energized, rotates in the closing direction.

The field coil 65 is connected to the positive power supply line P through a pump mode relay contact 71a, a gate limit switch 79 and an upper limit switch 75.

The field coil 66 is also connected to the positive power supply line P through a unit start relay contact 71b and a lower limit switch 76.

The main gate limit motor 11 is connected to the negative power supply line N through an adjustable resistor 81 so as to control the speed of the main gate limit motor 11.

Before starting the operation of the pump, the unit start relay contact 71b closes and the main gate limit motor 11 continues to rotate to the fully closed position of the guide vanes till the lower limit switch 76 opens.

At the beginning of the pump operation the pump mode relay contact 71a is closed and the unit start relay contact 71b is opened, so that the main gate limit motor 11 continues to rotate in the opening direction of the guide vanes till the gate limit switch 79 opens.

In this operation, the gate limit switch 79 is set to open when the guide vanes reach the opening position, $g_C$ as illustrated in FIG. 2, and after that the main gate limit motor 11 is kept at the same position while operating the pump.

The auxiliary gate limit motor 12 is also provided with two field coils 67, 68, respectively connected to the positive power supply line P through a time delay relay contact 73b and an upper limit switch 77, through a time delay relay contact 73a, a lower limit switch 78 and a gate limit switch 80. The variable resistor 82 connects the auxiliary gate motor 12 to the negative power supply line N and is used to control the speed of the auxiliary gate limit motor 12.

Before starting the operation of the pump, the time delay relay contact 73b closes and the auxiliary gate limit motor 12 continues to rotate to the fully opened position, $g_F$ as illustrated in FIG. 2, till the upper limit switch 77 opens.

After the time delay period $T_D$ from the beginning of the operation of the pump, the time delay relay contact 73a is closed and the time delay relay contact 73b is opened so that the auxiliary gate limit motor 12 begins to rotate in the closing direction of the guide vanes till the gate limit switch 80 opens. The gate limit switch 80 is set to open when the guide vanes reach the opening position, $g_B$, as illustrated in FIG. 2.

Referring to FIG. 4, the main gate limit cam 13 and the auxiliary gate limit cam 14 are respectively connected to the main gate limit motor 11 and the auxiliary gate limit motor 12, so that the maximum height of the main gate cam 13 and the auxiliary gate cam 14 respectively vary in accordance with the value of the main gate limit and the auxiliary gate limit.

The sliding rod 15 which is slidably supported by the bearing stand 16 is pushed up by the cam 13 or 14 against the spring 17.

The position of the sliding rod 15 is determined by the minimum value of the two gate limits. When the value of the auxiliary gate limit is smaller than that of the main gate limit, the maximum height of the auxiliary gate cam 14 is higher than that of the main gate cam 13 so that the sliding rod 15 is pushed up by the auxiliary gate cam 14.

This movement of the sliding rod 15 is transmitted to the servo-motor system, which comprises a pilot valve 20, a valve servo-motor 30, a distributing valve 40 and a gate servo-motor 50 which are operated by pressure oil.

An oil pump (not shown) maintains a supply of pressure oil to the pilot valve 20 and the distributing valve 40.

The movement of the sliding rod 15 is first transmitted through a float lever 18 to a pilot plunger 21 of the pilot valve 20 which is slidably mounted within a sleeve 22. The sleeve 22 is also slidably mounted within the servo-motor system and is connected to a feed back lever 25 at its top end such that the sleeve 22 moves in accordance with the movement of the feed back lever 25 and is spring-loaded at its bottom end by a spring 27.

The feed back lever 25 is provided with a fulcrum point 26 about which the lever pivots and with a projection for connecting the top end of the sleeve 22, and rotatably connected to a shaft 32 of a differential piston 31 fitted in the valve servo-motor 30.

Stud bolts 27' are secured on the top of the valve servo-motor 30 so that the vertical stroke of the differential piston 31 is adjusted.

A piston 41 of the distributing valve 40 is directly connected to a shaft 32 of the differential piston 31.

Both sides of a piston 51 of the gate servo-motor 50 are liquidly connected to the distributing valve 40 through pipes 52, 53, so that the distributing valve 40 controls the flow of oil to the gate servo-motor 50. When the piston 41 of the distributing valve 40 moves to the upward direction, pressure oil from the distributing valve 40 enters into the left side of the piston 51 of the gate servo-motor through pipe 53 causing the movement of the piston 51 of the gate servo-motor 50 to the opening (right) direction.

The movement of the gate servo-motor 50 is detected by a feed back lever 61 and transmitted to the middle portion of the float lever 18 through a connecting link 62 and a lever 63 with a fulcrum point 64 on the middle thereof so as to compensate the difference between the actual movement of the gate servo-motor 50 and the movement of the sliding rod 15.

In this manner, the gate servo-motor 50 moves in proportion to the movement of the sliding rod 15.

While a preferred embodiment of the present invention has been described in detail with respect to the drawing for purposes of illustration and the specific advantages of the details, further embodiments, variations and modifications are contemplated according to the broader aspects of the present invention, all as defined by the spirit and scope of the following claims.

What is claimed is:

1. A method of starting pump operation for a rotary machine that has adjustable guide vanes circumferencially arranged around a runner and a range of guide vane openings wherein there is discontinuity in head-capacity curves for a system head, which comprises the steps of: opening the adjustable guide vanes to a predetermined opening position beyond an optimum opening position where the pump operates under an optimum driving condition without reverse flow in the runner so that no reverse flow in the runner appears, and thereafter closing the adjustable guide vanes to (a reclosed position) said optimum opening position.

2. A method as described in claim 1, further including the step of keeping the adjustable guide vanes in said predetermined opening position for a predetermined period of time sufficient to stabilize flow in the system before said step of closing.

3. A method as decribed in claim 2, wherein said predetermined period of time is at least long enough for the liquid that has passed through the vanes at the predetermined opening position to be discharged from a pumped liquid flow pipe connected to the rotary machine.

4. A method as described in claim 2, wherein said predetermined period of time is at least shorter than the period of fluctuation, as caused by starting, of the surge tank connected to the pumped liquid flow pipe.

5. A method as described in claim 1, wherein said optimum opening position is determined from an experimentally obtained head-capacity curve of the rotary machine where the maximum discharge flow rate is obtained at a designed static head, and said predetermined opening position is determined from the head-capacity curve and the flow rate thereon that is approaching and is smaller that that on said optimum opening position.

* * * * *